(12) United States Patent
van den Berg

(10) Patent No.: US 8,335,022 B2
(45) Date of Patent: Dec. 18, 2012

(54) AUTOMATIC ADDRESS FIELD IDENTIFICATION

(75) Inventor: Rene van den Berg, Groningen (NL)

(73) Assignee: Neopost Technologies, Bagneux (FR)

( * ) Notice: Subject to any disclaimer, the term of this patent is extended or adjusted under 35 U.S.C. 154(b) by 0 days.

(21) Appl. No.: 13/415,570

(22) Filed: Mar. 8, 2012

(65) Prior Publication Data

US 2012/0229874 A1   Sep. 13, 2012

(30) Foreign Application Priority Data

Mar. 9, 2011 (EP) .................................... 11001961

(51) Int. Cl.
*H04N 1/04* (2006.01)

(52) U.S. Cl. ......... 358/474; 358/449; 358/452; 358/448

(58) Field of Classification Search .................. 358/474, 358/449, 452, 448
See application file for complete search history.

(56) References Cited

U.S. PATENT DOCUMENTS 6,014,450 A   1/2000   Heilper et al.
7,219,482 B2 *   5/2007   Stemmle ......................... 53/429
7,896,335 B2 *   3/2011   Stemmle ............................ 271/2
2006/0254216 A1   11/2006   Stemmle

FOREIGN PATENT DOCUMENTS

| EP | 0 498 515 A1 | 8/1992 |
| EP | 1 625 947 A2 | 2/2006 |
| EP | 2 293 254 A1 | 3/2011 |

* cited by examiner

*Primary Examiner* — Houshang Safaipour
(74) *Attorney, Agent, or Firm* — Sughrue Mion, PLLC

(57) ABSTRACT

A method for automatically determining a position of an address field on a document comprising:
  scanning a face of the envelope provided with the window so as to obtain scan-data representing an image of the scanned face of the envelope;
  comparing the scan-data with characteristics indicative of a human-readable address;
  selecting a subset of the scan-data meeting characteristics of human-readable address;
  determining the position of markings represented by the selected subset of the scan-data; and
  calculating the position of an address field on the document from data representing at least the position of the selected subset of the scan-data on the envelope face and a clearance or clearance range between the document and the envelope.

10 Claims, 10 Drawing Sheets

AUTOMATIC ADDRESS FIELD IDENTIFICATION

FIELD AND BACKGROUND OF THE INVENTION

The present invention relates generally to automatic identification of an address field on a document.

In automated mail inserting it is common to process documents that are to be mailed in accordance with markings on the documents. Conventionally, such markings include optical marks which have predetermined meanings, such as indications of stations from which enclosures have to be added selectively, an indication that the sheet is a last or a first one of a set of sheets to be gathered. Automated mail inserting systems typically include an OMR reading station for reading such optical markings. Also other types of markings, such as barcodes can be used for this purpose. Such barcodes can also be used for tracking and tracing purposes.

It is however preferred to avoid the need of including markings specifically included for automatic mail piece preparation, since such markings disturb the visual appearance, distract from the contents of the document and require space to be kept free from other markings, which reduces the freedom of graphic design. Moreover, generating and applying such marks can be a complicated and costly operation.

With the advent of modern scanning techniques, it has become viable to scan the documents (which may be single sheets or sets of sheets) to be processed and use markings of the contents that are not specifically included for mail preparation purposes to identify the documents and/or the preparation steps that have to take place. A part of a commercial mail document that is specifically suitable for use as a basis for determining processing steps and for tracking and tracing is the address to which the document is to be sent, since the addresses of a series of documents of a mailing are typically at generally identical locations and are all unique to the respective document.

Acquiring address information from each document requires that the addressee information is read from the documents. One known approach is to use special marks on the documents to identify the area of interest in which the addressee information is present, but this requires special applications to generate the marks and/or the marks occupy a portion of the document and distract from an ideal personalized presentation. Other techniques for locating the address include heuristic algorithms based on standard templates, and neural network technologies. However, automatically identifying an address in the entire contents of a document would be a complex operation which is an important disadvantage in the field of automatic mail inserting systems which operate at high speed and in which available computing power is limited in view of cost restraints.

SUMMARY OF THE INVENTION

It is an object of the invention to provide a solution which allows to identify the location of an unknown address in a document in a mail inserting system in a quick and simple manner.

According to the invention, this object is achieved by providing a method for automatically determining a position of an address field on a document comprising:

providing an envelope having a face provided with a window dimensioned and positioned such that an address in the address field of the document inserted in the envelope is visible behind the window;

scanning a face of the envelope provided with the window so as to obtain scan-data representing an image of the scanned face of the envelope;

comparing the scan-data with characteristics indicative of a human-readable address;

selecting a subset of the scan-data meeting characteristics of human-readable address;

determining the position of markings represented by the selected subset of the scan-data; and calculating the position of an address field on the document from data representing at least the position of the selected subset of the scan-data on the envelope face and a clearance or clearance range between the document and the envelope, further comprising folding the document, prior to insertion, in accordance with selected fold settings, wherein the data from which the position of the address field is calculated further include the selected fold setting.

The address bearing face of an envelope is by virtue of international postal regulations relatively uncluttered and the location of the address is in most cases limited to a limited portion of the address bearing face. As a result, it is almost always far more simple to automatically and reliably identify the location of an address on an envelope than on a document. The present invention leverages this relatively low technical cost in determining the position of the address on the document from the determined position of the address on the envelope. Once this position has been established, the information on the position can be used for subsequent documents a series of documents of a mailing to quickly extract the addresses from these subsequent documents.

In a particular mode of the invention, fold settings for the preparation of a mailing are determined, which involves preparing one or more test mail pieces from test copies of documents to be mailed, to establish fold settings at which the address appears behind the window properly. By identifying the address location from the test mail pieces prepared at the fold settings that are subsequently used when preparing the mail pieces of the mailing, the identification of the location of the address field for a mailing requires no additional steps in addition to the preparation of test mail pieces that is already carried out to determine proper fold settings for that mailing.

The present invention may also be embodied in an inserting system comprising:

at least one document feeder for individually feeding documents from a stack;

an inserter arranged for receiving documents from the document feeder and inserting the received documents into envelopes;

an envelope feeder for individually feeding envelopes from a stack to the inserter;

a document scanner upstream of the inserter, for scanning documents;

an envelope scanner at or downstream of the inserter, for scanning envelopes so as to obtain scan-data representing images of the scanned faces of the envelopes;

a control structure programmed for:

controlling the envelope feeder for feeding an envelope to the inserter;

controlling the document feeder for feeding a document to the inserter;

controlling the inserter for inserting the document into the envelope;

controlling the envelope scanner to scan a face of the envelope provided with a window so as to obtain scan-data representing an image of the scanned face of the envelope;

comparing the scan-data with characteristics indicative of a human-readable address;

selecting a subset of the scan-data meeting characteristics of human-readable address;

determining the position of markings represented by the selected subset of the scan-data; and calculating the position of the selected subset of the scan-data on the document from data representing at least the position of the selected subset of the scan-data on the envelope face and a clearance or clearance range between the document and the envelope, further comprising a folder arranged for folding documents prior to insertion by the inserter, wherein the control structure is programmed for obtaining and storing folding data representing a fold setting of the folder, and for calculating the position of the address field on the document from data that further include the selected fold setting, which inserting system is specifically suitable for carrying out the method according to the invention.

Further subsidiary features and details of the invention are described in the following description.

DETAILED DESCRIPTION

Figure 1:
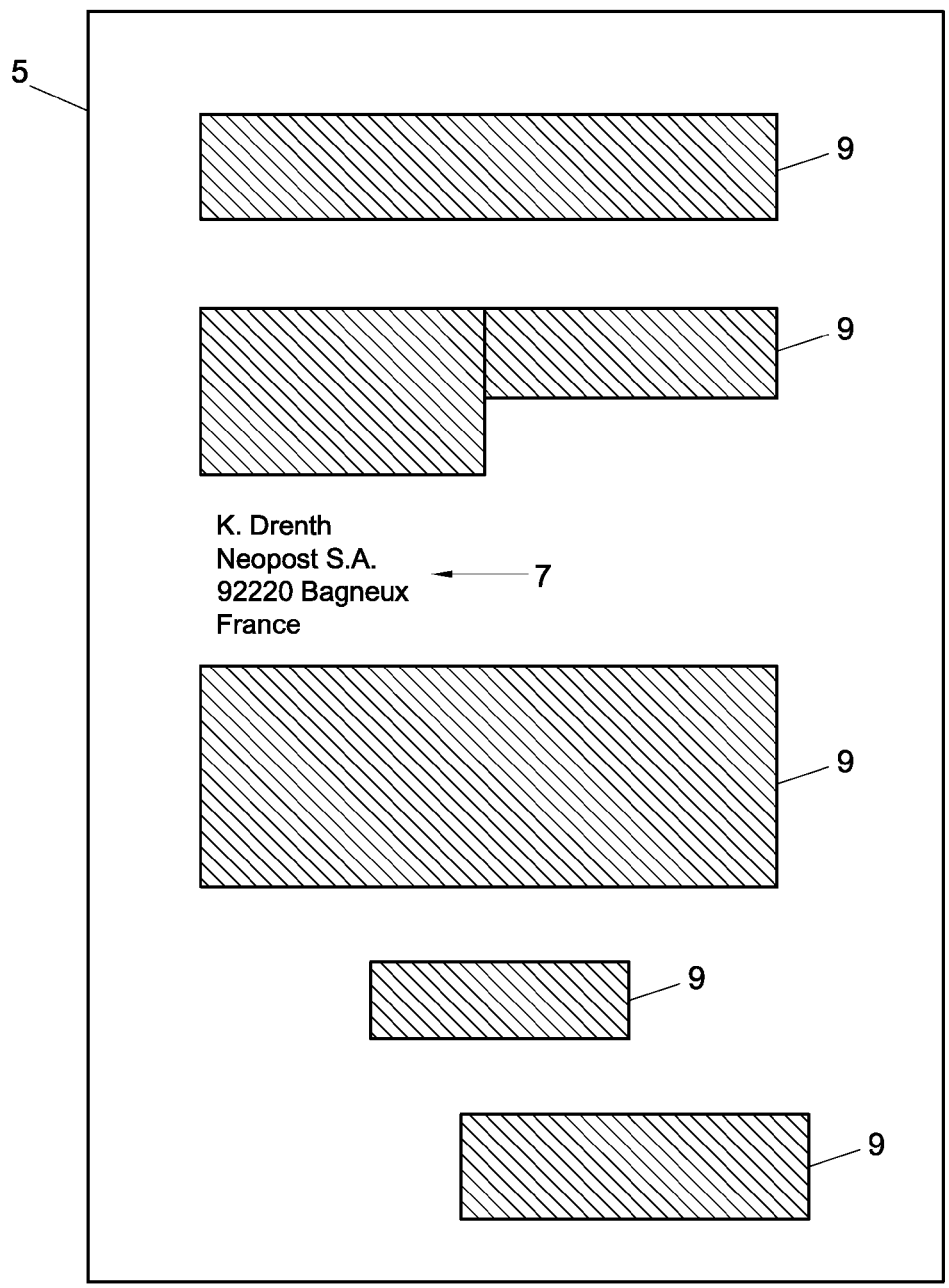
FIG. 1 shows a face of an example of a document that may form part of a mail piece.

FIG. 1 shows an example of a document 5 constituted by a single sheet. The document 5 includes an address 7 which is composed of the name and address of the intended recipient of the document. Other content, in most cases text, is represented schematically as hatch-shaded boxes 9. In mass mailing applications, it would be desirable for the layout of the document to be completely unrestricted. This is particularly the case in the advertising industry where the personalization of material and graphic design have proven to be key factors in its effectiveness. The requirement that the layout of the document be completely unrestricted, means that the address might appear at any location on the sheet in any context has the consequence, however, that the technical cost, in terms of scanning and processing resources, of extracting the address information is high.

Figure 2:
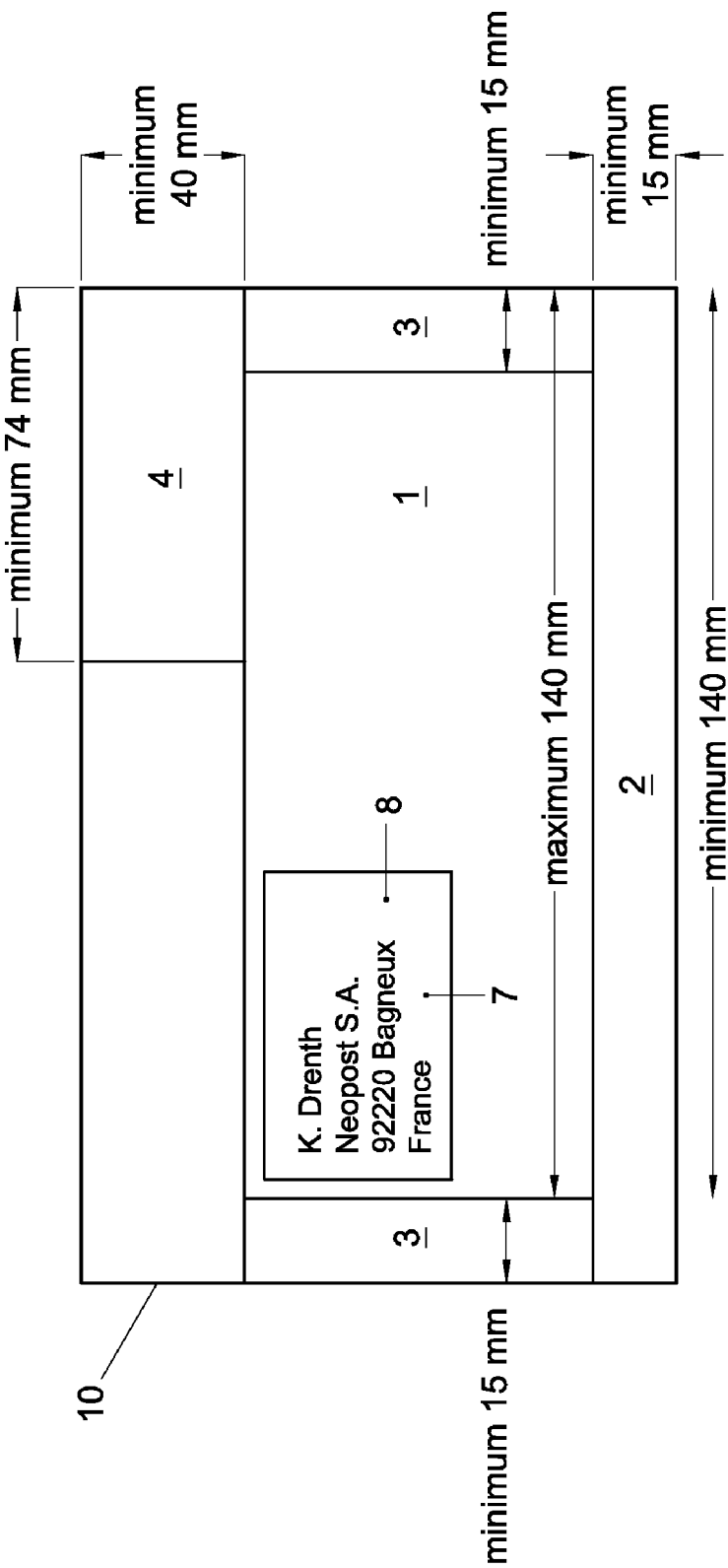
FIG. 2 shows a face of an example of an envelope that may form part of a mail piece.

The situation with regards to the envelope is, however, quite different. The Universal Postal Union (UPU) is an international organization that sets postal standards which seek to ensure interoperability between the world's postal services. One such standard specifies the requirements for the position of an address on an envelope. These requirements are illustrated by FIG. 2 which shows the front face of a window envelope 10 with an address 7 visible though a window 8 in the envelope face. The area reserved for the addressee information is designated by reference number 1. The address must be in area 1, which means that it must be at least 15 mm from the right-hand edge, at least 15 mm from the bottom edge, at least 40 mm from the top edge and at most 140 mm from the right-hand edge. Area 2 must be left blank and is used as an indexing or coding area by postal services. Both areas 3 must also be left blank and are used by postal services in detecting the address 7. Area 4 is reserved for prepayment and cancellation indicia. In addition, no wording or extraneous matter is to appear to the right of the addressee information, below the addressee information, to the left of the addressee information, in an area at least 15 mm wide and running from the first line of the addressee information to the bottom edge of the envelope and 140 mm long starting from the right-hand edge of the item. National postal services are free to mandate additional requirements providing they are consistent with the minimum requirements of the UPU postal standards. As a result of these requirements and also in view of the general tendency to print relatively little information on envelopes (at least when compared to the density of information generally found in documents), the technical cost, in terms of scanning and processing resources, of extracting the address information from the envelope is much lower.

Figure 3:
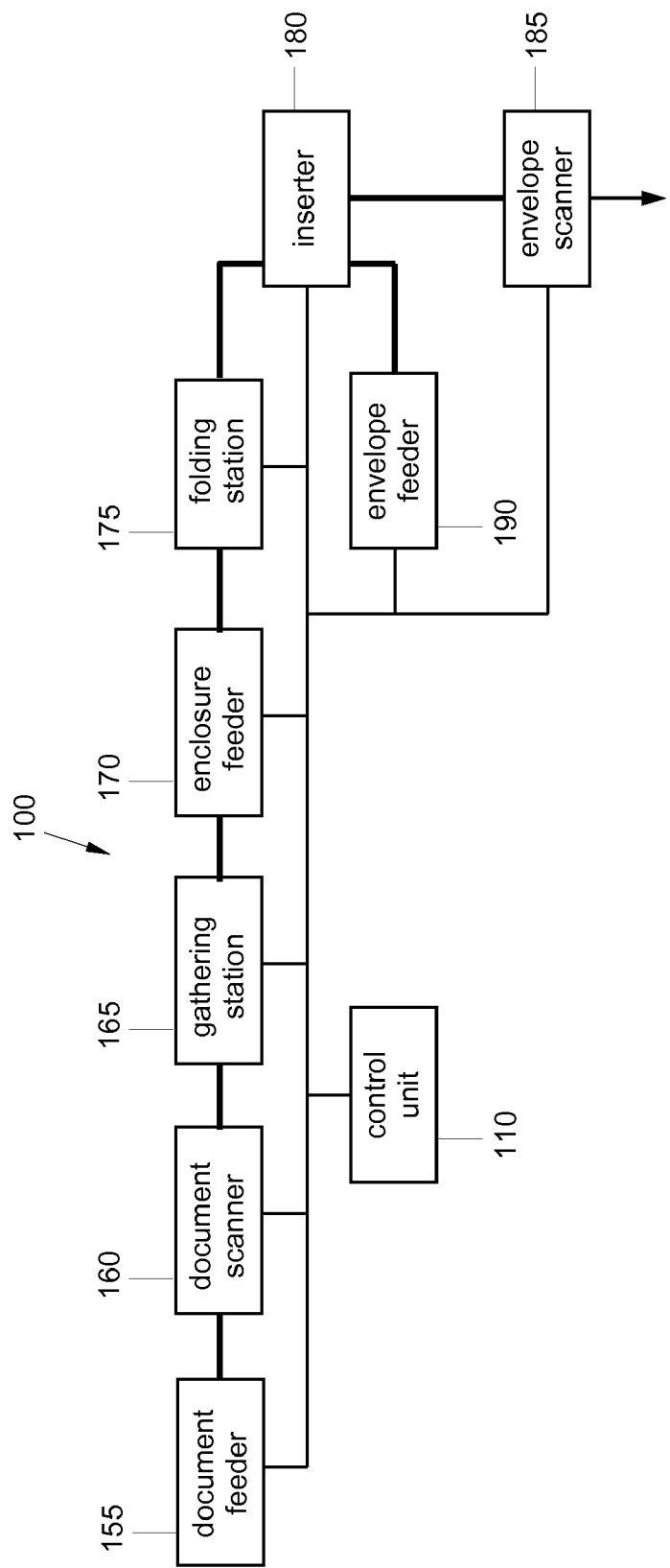
FIG. 3 is a schematic representation of an inserting system according to the invention.

In FIG. 3 an inserting system 100 is shown composed of in the order of processing or downstream direction, a document feeder 155; a document scanner 160; a gathering station 165, an enclosure feeder 170; a folding station 175; an inserter 180 and an envelope scanner 185. Furthermore, an envelope feeder 190 is provided for feeding envelopes to the inserter 180. Stations 155, 160, 165, 170 operate to form a stack of sheets which make up the document or documents for a single mail piece. The document feeder 155 is constructed to separate and feed sheets from a stack to the document scanner 160. At the gathering station 165, successive received sheets may subsequently be collected into stacks of sheets, generally this stack would constitute the main document of the mail piece. The stack then passes along the enclosure feeders 170 where enclosures may be added to the stacks, either selectively or irrespective of instructions. In the present example only one enclosure feeder is shown. However, a plurality of such enclosure feeders may be provided to add several different enclosures. Instead of passing along the stations as a stack, the documents to be gathered may also pass individually to a gathering station downstream of the feeders and the scanner. The completed stack of documents for each mail piece may then be folded at the folding station 175, before it is fed to the inserter 180 to which an envelope has been fed previously, so that the folded stack can be inserted into the envelope. In some applications, the documents may be inserted without having been folded.

A mail piece constituted by an envelope with documents and enclosures therein may be scanned by an envelope scanner 185, which is arranged for scanning the face of the envelope where the address is located. The address may have been printed on the envelope or be visible (i.e. scannable) through a window of the envelope.

One functions of the document scanner 160 is scanning of addresses from the documents. On the basis of data extracted from the address, the enclosure feeder 170 may be instructed to selectively add enclosures. Also, the identification of an address may be used as an indication that the sheet constitutes the first sheet (when gathering face down) or the last sheet (when gathering face up) of a set for a mail piece. However, identifying an address in a scanned image of a complete document is in most cases a complex and too time consuming operation. It is therefore desirable to restrict the scanned area of the document from which an address is to be extracted to a limited address field. For a series of documents of a mailing, this address field will typically be in the same position. Nevertheless, automatic determination of this position, even in a setting mode prior to operation in a production mode, should preferably be carried out quickly and without requiring additional input from an operator.

The system 100 outlined above can be made to operate in a number of modes as described below. For the purposes of clarity, the following description assumes that the mail piece is of the simplest kind comprising just a single sheet document and an envelope. However, it will be appreciated that the following description applies, mutatis mutandis, to instances where the mail pieces comprise multi-sheet documents and more than one document per mail piece. As an example, a typical mail piece may comprise a first document in the form of a covering letter which includes the name and address of the addressee together with a second document in the form of an advertising pamphlet, the contents of which are addressee independent.

Figure 4:
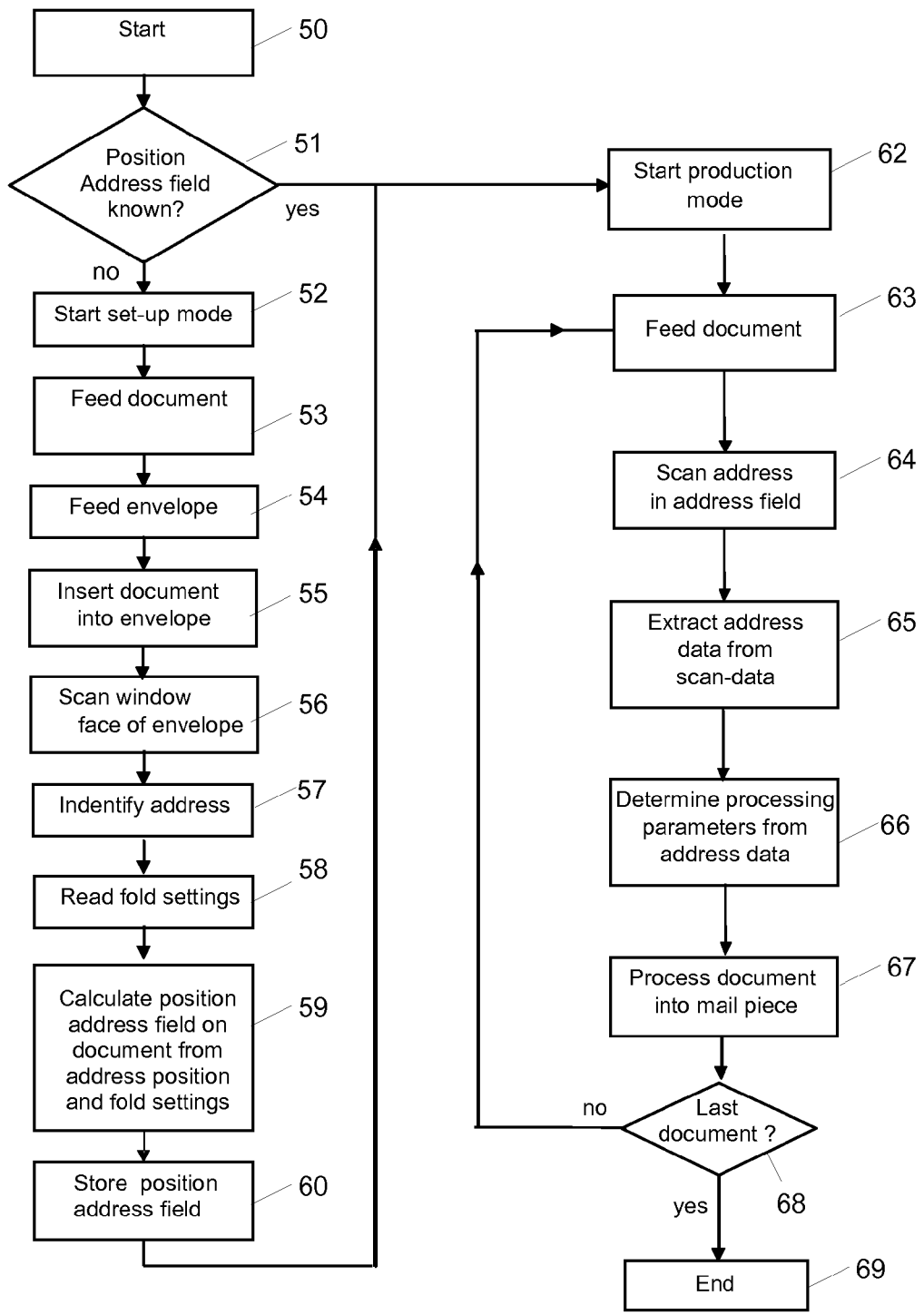
FIG. 4 is a flow diagram representing operation of the FIG. 3 system when in a batch mode.

In one mode of operation, the system 100 operates in a batch mode according to the process depicted in FIG. 4. At the start of a batch, step 50, the control unit 110, checks, at step 51, whether the address field position, i.e. the area of the document from which the address may be scanned from each of the documents of the next batch of documents to be processed, is known.

If the position of the address field position is not known, a set-up or training procedure, steps 52-60, is commenced at step 52. An exemplary or training document, for instance an additional copy of a document of the batch is fed from the document feeder 155 (step 53) and an envelope is fed from the envelope feeder 190 to the inserter. The document is transported along the stations 160, 165, 170, folded by the folder 175 and supplied to the inserter where the document is inserted into the envelope that has been fed from the envelope feeder 190 (step 55). Then, the scanner 185 scans the face of the envelope, either completely or in the limited area dictated by the UPU standard (step 56).

The control unit 110 processes the scan-data representing an image obtained by the scanning operation. Next the scan-data are processed for identifying an address in the scan-data (step 57). Depending on the implementation, this may involve optical character recognition and/or the comparison with visual characteristics of an address in a letter. Features of an address identifiable after optical character recognition are for instance the presence of wording like Mr., Mrs. etc., the presence of a house number in a particular position and the presence of a postal code in a particular position. A visual feature of an address is for instance the presence of three to five lines of relatively small length, aligned to the left and with relatively much white space above and below the address. Because of the limited amount of data on the face of an envelope, in particular if only the address area defined by the UPU postal standards is scanned or analyzed, it is not difficult to identify the address on the envelope face. This in contrast to identifying the address from identify an unknown address in a document containing a large amount of text.

At step 58, the fold settings in accordance with which the document has been folded is read (step 58). At step 59, the position of the address field on the document is then calculated from the position of the address on the image of the scanned face of the envelope the fold settings and data representing the clearance or clearance range between the edges of the envelope and the edges of the document. Finally, the address field position is stored at step 60.

The address field position may be defined only by its position and have a fixed, predetermined size and shape, be defined by a plurality of positions (e.g. positions of diagonally opposite corners) or a combination of information on its position and dimensions. In the present example, the address field position is of a fixed size and shape and defined by its position only.

It is noted that the procedure of determining the address field position may be repeated with a different fold setting if the position of the address is found to be not satisfactorily. Such test insertions with different fold setting are common practice in the operation of inserting systems with window envelopes, so the determination of the address field position on the documents can each time be carried out simultaneously with a test insertion at one or more fold settings that is carried out anyway and therefore requires no additional operator effort or time.

Having stored the position of the address field in the documents to be processed at step 60, the production phase is started at step 62. At step 63, a document to be included in a mail piece is fed from the document feeder 155. At step 64, the document is scanned by the document scanner 160. Depending on operating features of the scanner, this scanning may involve scanning the whole document or only the address field. At step 65, the address data are extracted from the scanned address by commercially available optical character recognition (OCR).

At step 66, the data extracted from the address are used as a basis for determining processing parameters for the scanned documents. This may for instance involve the determination whether an enclosure is to be added by enclosure feeder 170, by comparing the scanned address data with instructions associated to that address in a database. In applications where the documents are multi-sheet units, the presence of an address can also be used to determine instructions for the gathering station as discussed above. Then, at step 67, a command for processing the document into a mail piece in accordance with the determined processing parameters is outputted. The inserting system is then controlled by the control unit to carry out such processing in an otherwise known manner which is not described in further detail.

At step 68, it is checked whether the document is the last one of a batch. If not, operation continues with step 63 for a next document. The feeding of a next document may start prior to completion of the processing of a previous document. If the document to be processed is the last document of a batch the algorithm ends (step 69).

The system architecture shown in FIG. 3 is only one of the many possibilities suitable for carrying out methods according to the present invention. In other embodiments, each scanner may include its own dedicated local control unit. The central control unit 110 may play a role in processing the scanned data and determining the address field. In addition, station 155, 165, 170, 175 may be replaced with other document-assembling arrangements.

In the examples above, the addressee information on both the envelope and the document is in Roman characters and Arabic numerals. In other embodiments, this need not be the case and the addressee information may be in non-Roman characters including, but not limited to, for example, other alphabets like Cyrillic or Arabic, syllabaries like Hangul, or Sinographic logograms (as found in Chinese and Japanese). Similarly, non-Arabic numerals may be used. Accordingly, as used herein, the term 'text' should be construed to include such non-Roman characters and non-Arabic numerals.

Next, it is described with reference to FIGS. 5-11 how the address field position on the document may be determined from the position of the address on the envelope.

Figure 5:
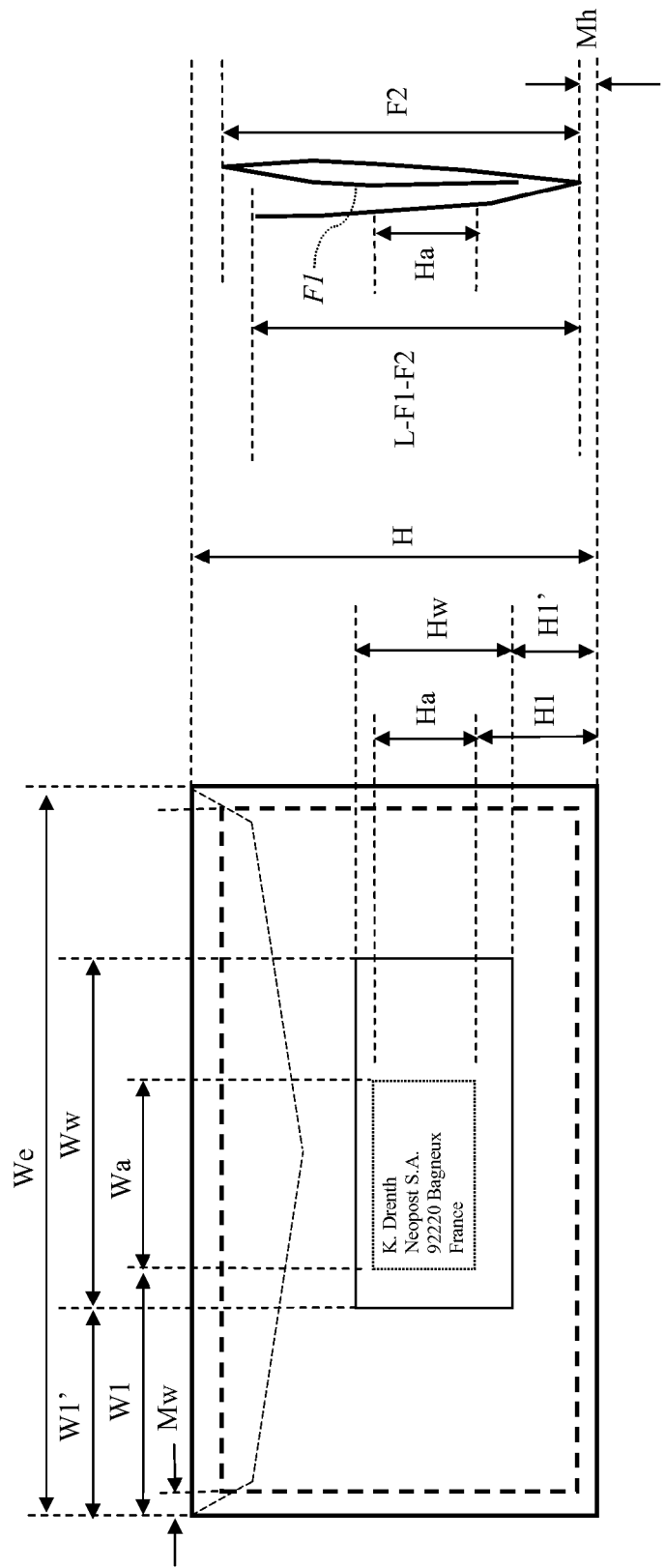
FIG. 5 is a schematic representation in plan and related side view of the position of a folded document in an envelope.
Figure 6:
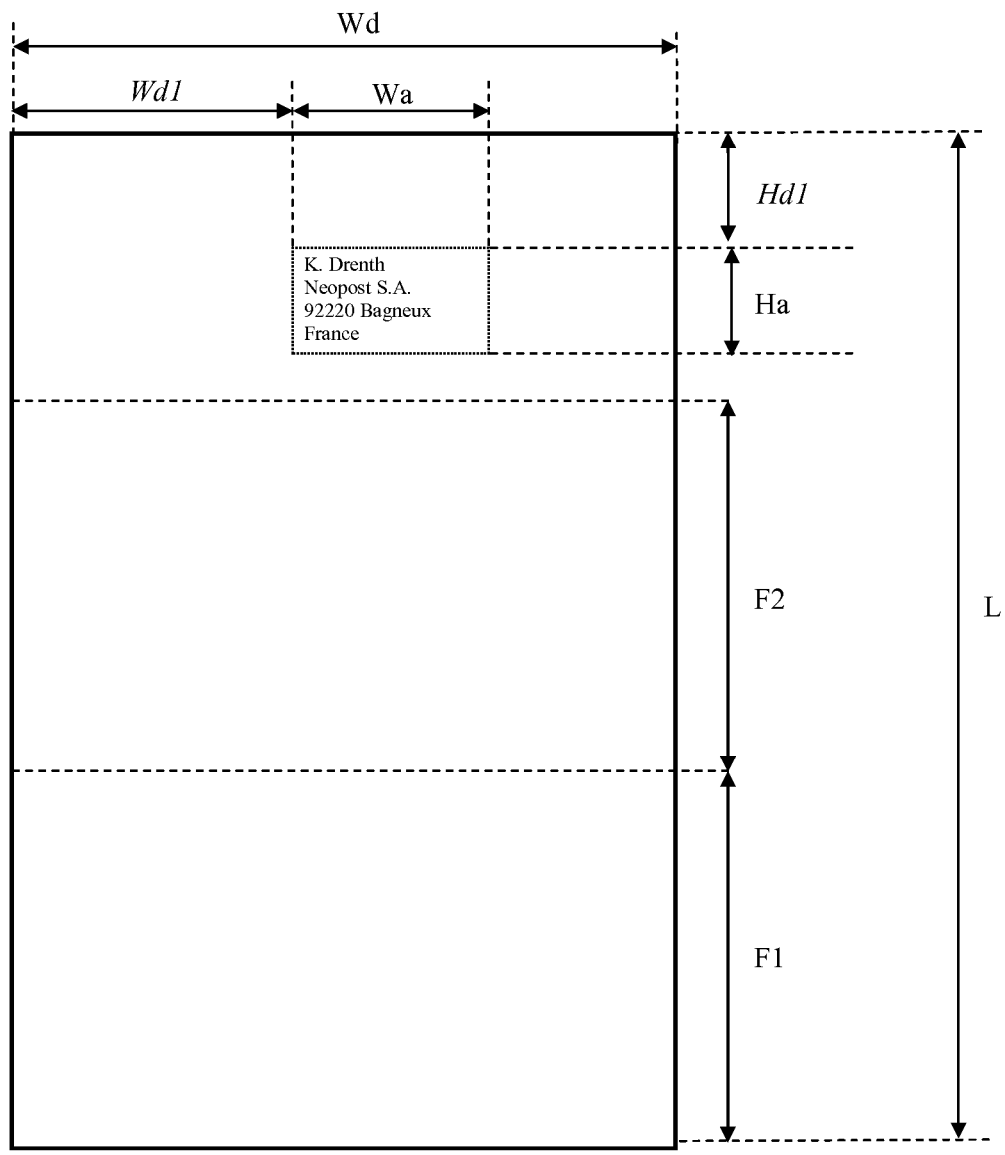
FIG. 6 is a plan view of the document of FIG. 5.

FIGS. 5 and 6 apply to folding settings in which the document is to be folded so-called in C-fold.

The system dimensions H and L are known (measured by system or by user input). The folding length settings F1 and F2 are also known, for instance from settings of folding chutes of the folder 175.

The address height Ha and the spacing H1 from the bottom edge are determined from the identified address.

The distance Hd1 of the address field from the top edge of the document is then determined is determined as follows:

$$Hd1 = L - F1 - F2 - (H1 - Mh) - Ha$$

This equation does not take into account the clearance Mh between the document and the envelope edge. In order to determine height position of the address on the document, it's important to know the height margin that should be applied. The maximum clearance is the maximum distance between the bottom of the folded document and the bottom of the envelope, assumed the folded document fits in the envelope and the folded document has been inserted at least as far as the flap fold line (so the flap can be closed without any obstruction):

$$Mh_{max} = H - \max(F2, ((L-F1-F2) \text{ for } F1 \leq F2)), ((L-F2) \text{ for } F1 > F2)), \text{ Length of unfolded enclosure})$$

$$Mh_{min} = 0$$

Depending on the system, it is possible that the folded documents are normally not inserted up to the bottom of the envelope, and do not have a possibility to shift towards the bottom of the envelope before the envelope is scanned. In this case, a practical limitation of the clearance can be applied. This may be related to the top side (flap fold line) of the envelope, in which case the formula becomes slightly different.

The equation now becomes:

$$Hd1_{min} = L - F1 - F2 - H1 - Ha$$

Hd$1_{max}$ is less relevant, since this value should be set at the minimum value in order to ensure that the top part of the address will not be missed in the address field.

Figure 7:
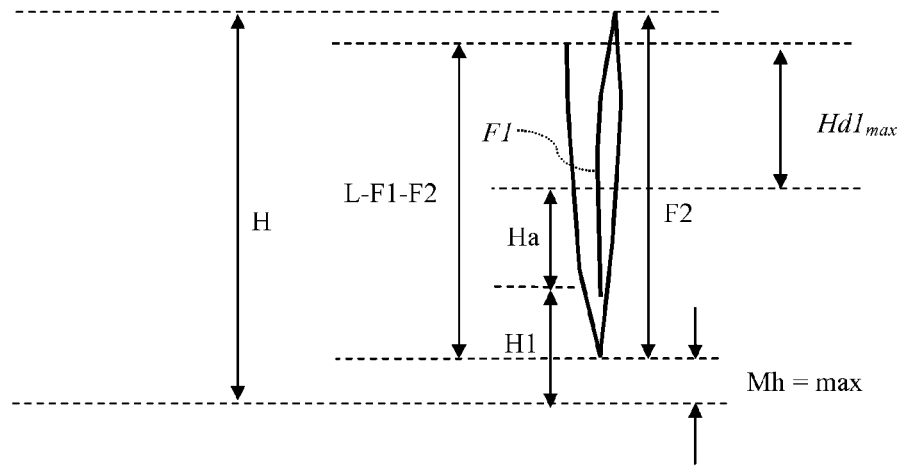
FIG. 7 and FIG. 8 are schematic side views of differently folded documents.
Figure 8:
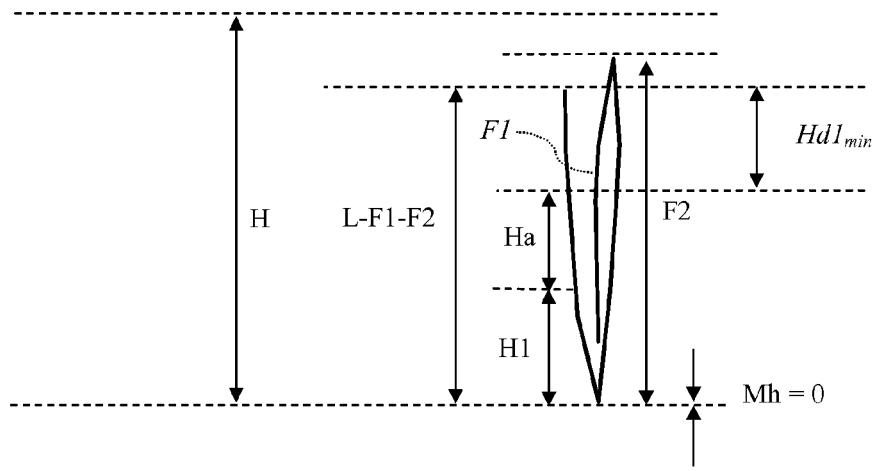

FIGS. 7 and 8 illustrate how the height of the address in the document Hd1 can differ, when the retrieved values for H, L, F1, F2, Ha and H1 are the same. In FIG. 7, the document is inserted just far enough to allow the flap to be closed. In this case the clearance Mh has the maximum value and Hd1 also has the largest value.

In the second situation, the document is inserted against the bottom of the envelope. Here the clearance Mh has the minimum value (approximately zero), and Hd1 has the smallest value considered possible with the measured values.

When the value of Mh is unknown, which is often the case in practice, the value for Hd1 should be set to the minimum, in order not to miss the address when scanning the document.

In order to retrieve the full address of each document in a batch, it is preferably taken into account that address dimensions can deviate from the address(es) scanned during set up. The address field, i.e. the area that will be decoded (e.g. using Optical Character Recognition) after the document has been scanned may for instance be defined by the following dimensions:

$H_{ROI}$=Height of region of interest
$Hd_{ROI}$=distance of ROI top side from top of the document
$W_{ROI}$=Width of region of interest
$Wd_{ROI}$=distance of ROI left side from left side of document The minimum height of the address field in the document can be defined as:

$$H_{ROI, MIN} = Ha + Mh_{max}$$

However, in practice it is possible that some addresses in a batch of documents will have one or more additional lines in the address, compared to the address(es) used during the set up procedure. Such lines will usually be added on the bottom side of the address, although additional lines on the top side could also occur. Therefore an additional margin on both sides of the address block on the document can be added. This may be added in accordance with fixed values, like 10 mm on top and 15 mm at the bottom, but it could also be set depending on the font size and line distance used in the address of the trial document.

A default height for the ROI can thus be as follows:

$$H_{ROI} = Ha + Mh_{max} + 15 \text{ mm}$$

The distance from the top of the document to the top of the Region of interest is equal to the previously determined Hd$1_{min}$, lowered by a value for a potential higher first address line:

$$Hd_{ROI} = Hd1_{min} - 10 \text{ mm} = L - F1 - F2 - H1 - Ha - 10 \text{ mm}$$

The need and magnitude of the value to anticipate for a potentially higher first line, can be a system setting, which may be adapted by an operator or technician, or adapted automatically by the system after learning a significant amount of addresses.

Figure 9:
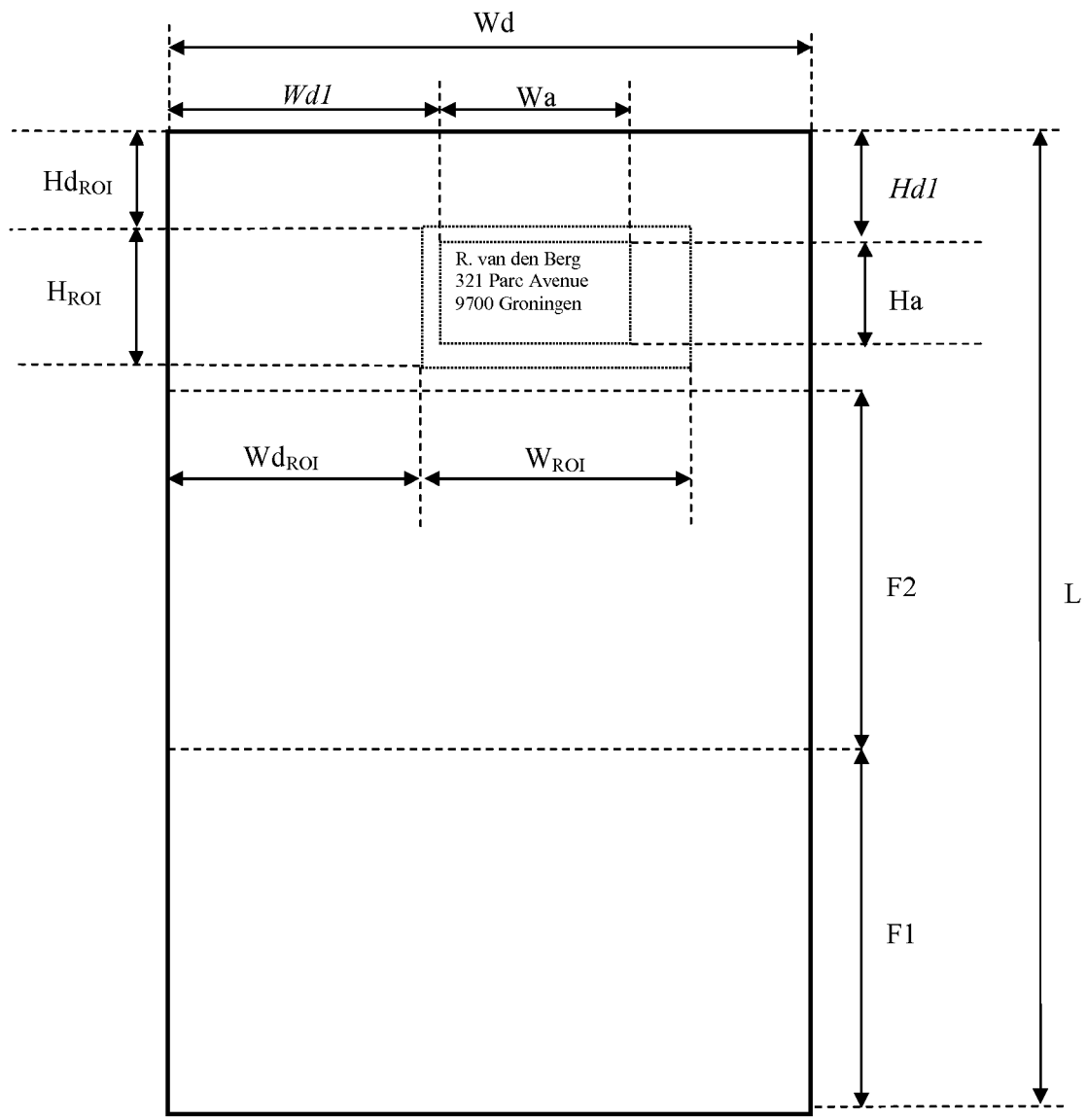
FIG. 9 is a plan view of another document.
Figure 10:
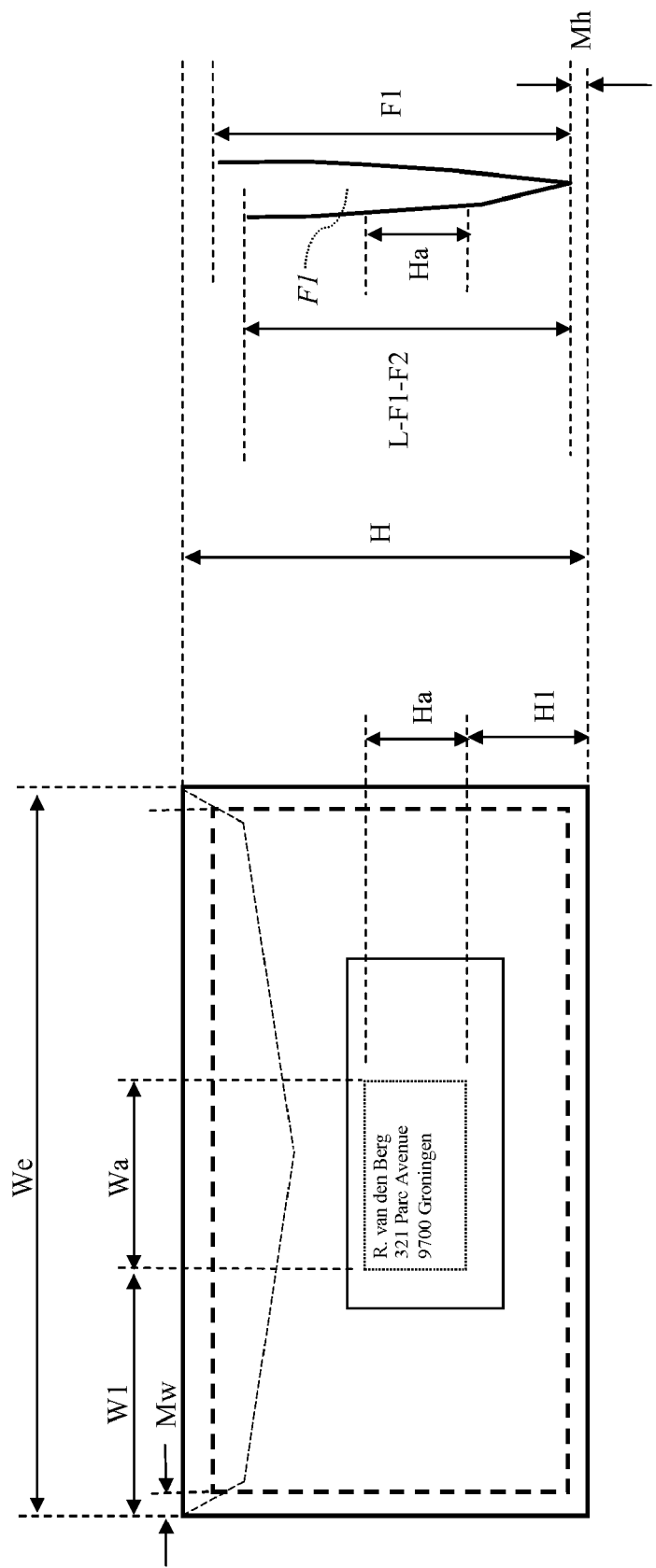
FIG. 10 is a schematic representation in plan and related side view of the position of a folded document in an envelope.
Figure 11:
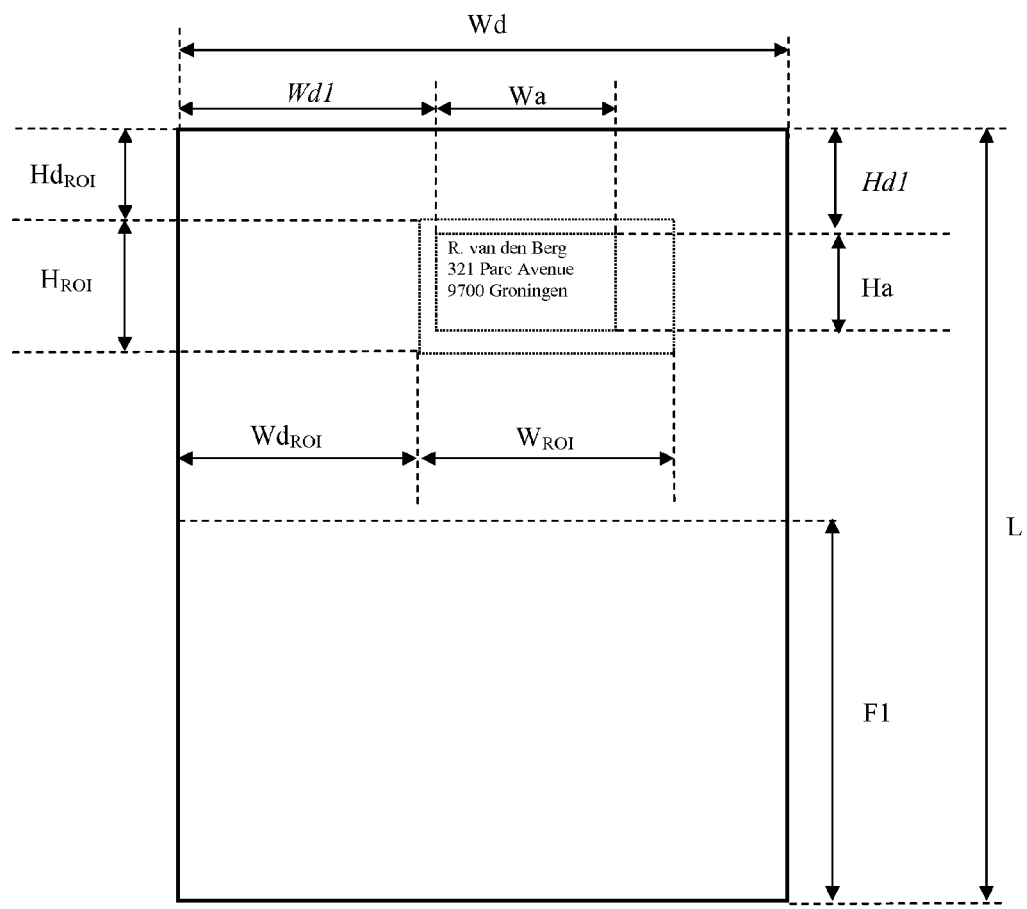
FIG. 11 is a plan view of the document of FIG. 10.

The determination of the width is explained with reference to FIG. 9. Envelope and document widths We and Wd are known (measured by system or by user input).

The address width Wa and spacing to the left hand edge W1 is determined from the identified address.

$$Wd1 = W1 - Mw$$

The minimum and maximum width clearances are:

$$Mw_{min} = 0$$

$$Mw_{max} = We - Wd$$

To avoid missing a left part of the address, for Wd$_{ROI}$ we can take $$Wd_{ROI} = W1 \text{ (assuming left alignment of the address)}$$

In case the scanned address would represent the maximum address width of all addresses in the batch, the width for the Address Region of Interest would be $$W_{ROI} = Wa + Mw_{max} = Wa + We - Wd.$$

However, it is likely that the trial document will not represent the maximum width. Therefore some additional margin is preferably taken compared to the address width Wa retrieved from scanning the envelope. A fixed size for W$_{ROI}$ may be taken as a default or a start value, like 8 or 10 cm, which may be increased in case a trial envelope is scanned with a wider address, or in case an operator or additional software may note errors in a scanned document address that may indicate that a too narrow region of interest was used.

The width of the ROI can therefore be set as follows:

$$W_{ROI} = \text{Max}((Wa + We - Wd), 10 \text{ cm})$$

In case font size and horizontal character spacing is known: the maximum address width determined can be adapted accordingly, e.g. by using a system setting for the maximum number of characters. In practice, more than e.g. 40 characters in an address line, without wrapping or truncation, will be uncommon.

In the example, left alignment of the address is assumed, which would be the default of the system.

When it is known that no left alignment is used, and longer addresses may also extend to the left side, an additional margin can be taken into account.

Calculation for other fold settings can readily be derived by the skilled person with reference to the principles discussed above, and based on the example given below In this example retrieving address position and orientation, depending on different fold settings can be performed based on information contained in the table given below. Using such a table, helps to determine in which part of the document the address is positioned, and what the orientation is.

The table is system dependent. This is an example for an inserting system using collating of documents from above, gathering documents face down in the most common situation, using two first fold chutes directed upwards and an optional third one directed downwards, inserting into envelopes with the window and the opened flap normally on the bottom side of the envelope (face down inserting).

| Fold length 1 (1<sup>st</sup> fold chute) | Fold length 2 (2<sup>nd</sup> fold chute) | Fold length 3 (3<sup>rd</sup> fold chute) | Fold type | Orientation of address on envelope* | Address position on document | Orientation of address on side of document: Face up/face down in document feeder (Face down loading in the document feeder will require scanning on the other side of the paper) | Orientation of address on side of document: Header leading/trailing in document feeder (e.g. leading will make the scanned characters be oriented upright, trailing will make they are upside down) |
|---|---|---|---|---|---|---|---|
| Short | Short | N/A | C-fold (letter fold) | Regular | Top | Face up | Leading |
| Long | Short | N/A | Z-fold | Regular | Top | Face down | Trailing |
| Middle | N/A | N/A | Single fold | Regular | Top | Face up | Leading |
| N/A | N/A | N/A | No fold | Regular | (Obvious) | Face up | Leading |
| Short | N/A | Short | Z-fold | Regular | Bottom | Face up | Leading |
| Long | N/A | Short | C-fold | Regular | Middle | Face up | Leading |

*The orientation of the address on the envelope can also be upside down (which seems to deliver so called 'bottom closing envelopes'), or it can be rotated by 90 degrees (requiring also a rotated envelope window) and even be on the flap side of the envelope, requiring a window on that side (and also an envelope scanner on the other side).

The indicated fold lengths are:
short: appr. ⅓ of document length;
middle: appr. ½ of document length; and
long: appr. ⅔ of document length.

The invention claimed is:

1. A method for automatically determining a position of an address field on a document comprising:
   providing an envelope having a face provided with a window dimensioned and positioned such that an address in the address field of the document inserted in the envelope is visible behind the window;
   scanning a face of the envelope provided with the window so as to obtain scan-data representing an image of the scanned face of the envelope;
   comparing the scan-data with characteristics indicative of a human-readable address;
   selecting a subset of the scan-data meeting characteristics of human-readable address;
   determining the position of markings represented by the selected subset of the scan-data; and
   calculating the position of an address field on the document from data representing at least the position of the selected subset of the scan-data on the envelope face and a clearance or clearance range between the document and the envelope,
   further comprising folding the document, prior to insertion, in accordance with selected fold settings, wherein the data from which the position of the address field is calculated further include the selected fold setting.

2. A method for preparing a plurality of mail pieces, comprising a method according to claim 1 and, subsequently, for each cycle for preparing a mailpiece:
   feeding a further envelope to the inserter;
   feeding a further document to the inserter;
   scanning at least a portion of the further document defined by the calculated position so as to obtain scan-data representing an image of at least a portion of the document defined by the calculated position;
   extracting address data from scan data representing the address field defined by the calculated position; and
   inserting the document into the envelope.

3. A method as in claim 2, wherein the further document is scanned only in the address field defined by the calculated position.

4. A method as in claim 2, wherein the whole of the further document is scanned, and portions of the scanned data outside the address field defined by the calculated position are disregarded.

5. A method as in claim 1, wherein extracting address data comprises performing optical character recognition and the address data comprise text data.

6. A method as in claim 1, wherein the envelope is scanned only in an area dictated by the UPU standard.

7. A method as in claim 1, wherein the address field is defined by a single pointer and has fixed predetermined dimensions.

8. A method as in claim 1, wherein the address field is further defined by dimensions determined from the selected sub-set of the scan data.

9. An inserting system comprising:
   at least one document feeder for individually feeding documents from a stack;
   an inserter arranged for receiving documents from the document feeder and inserting the received documents into envelopes;
   an envelope feeder for individually feeding envelopes from a stack to the inserter;
   a document scanner upstream of the inserter, for scanning documents;
   an envelope scanner at or downstream of the inserter, for scanning envelopes so as to obtain scan-data representing images of the scanned faces of the envelopes;
   a control structure programmed for:
   controlling the envelope feeder for feeding an envelope to the inserter;
   controlling the document feeder for feeding a document to the inserter;
   controlling the inserter for inserting the document into the envelope;
   controlling the envelope scanner to scan a face of the envelope provided with a window so as to obtain scan-data representing an image of the scanned face of the envelope;
   comparing the scan-data with characteristics indicative of a human-readable address;
   selecting a subset of the scan-data meeting characteristics of human-readable address;
   determining the position of markings represented by the selected subset of the scan-data; and
   calculating the position of the selected subset of the scan-data on the document from data representing at least the position of the selected subset of the scan-data on the envelope face and a clearance or clearance range between the document and the envelope,
   further comprising a folder arranged for folding documents prior to insertion by the inserter, wherein the control structure is programmed for obtaining and storing folding data representing a fold setting of the folder, and for calculating the position of the address field on the document from data that further include the selected fold setting.

10. An inserting system, according to claim 9, wherein the control structure is further programmed for, for each next cycle for preparing a mailpiece:
   controlling the envelope feeder for feeding an envelope to the inserter;
   controlling the document feeder for feeding a document to the inserter;
   controlling the document scanner to scan at least a portion of the document defined by the calculated position;
   extracting address data from scan data representing an address field defined by defined by the calculated position; and
   controlling the inserter for inserting the document into the envelope.

* * * * *